(12) United States Patent
Chen et al.

(10) Patent No.: US 10,288,788 B2
(45) Date of Patent: May 14, 2019

(54) ELECTRONIC DEVICE DISPLAY WITH POLARIZER WINDOWS

(71) Applicant: Apple Inc., Cupertino, CA (US)

(72) Inventors: Cheng Chen, San Jose, CA (US); Masato Kuwabara, Tsukuba (JP); Christopher L. Boitnott, Half Moon Bay, CA (US); Jun Qi, Cupertino, CA (US); Nathan K. Gupta, San Francisco, CA (US); Victor H. Yin, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 15/451,223

(22) Filed: Mar. 6, 2017

(65) Prior Publication Data

US 2017/0176657 A1    Jun. 22, 2017

Related U.S. Application Data

(62) Division of application No. 14/075,419, filed on Nov. 8, 2013, now Pat. No. 9,618,669.

(51) Int. Cl.

| | |
|---|---|
| *G02B 1/14* | (2015.01) |
| *G02B 5/30* | (2006.01) |
| *G02B 1/18* | (2015.01) |
| *G02F 1/1335* | (2006.01) |
| *G02B 1/11* | (2015.01) |
| *G02F 1/1333* | (2006.01) |

(52) U.S. Cl.
CPC ............ *G02B 5/305* (2013.01); *G02B 1/11* (2013.01); *G02B 1/14* (2015.01); *G02B 1/18* (2015.01); *G02B 5/3083* (2013.01); *G02F 1/133528* (2013.01); *G02F 1/133533* (2013.01); *G02F 2001/133374* (2013.01); *G02F 2001/133538* (2013.01)

(58) Field of Classification Search
CPC ............. G02B 5/305; G02B 1/14; G02B 1/18
USPC .......................................................... 349/96
See application file for complete search history.

(56) References Cited

U.S. PATENT DOCUMENTS

| | | | |
|---|---|---|---|
| 4,181,756 A | 1/1980 | Fergason | |
| 5,607,789 A * | 3/1997 | Treger | H01M 2/0267 |
| | | | 324/426 |
| 7,432,649 B2 | 10/2008 | West | |
| 8,417,445 B2 | 6/2013 | Eom et al. | |

(Continued)

*Primary Examiner* — Lucy P Chien
(74) *Attorney, Agent, or Firm* — David K. Cole

(57) ABSTRACT

Electronic devices may be provided with displays that have polarizers. A polarizer may have a polymer layer that has a portion covered with a dichroic dye to form a polarized region and a portion that is free of dichroic dye to form an unpolarized region. The unpolarized region may be formed by masking the polymer layer during a dye coating process. Masks may be formed from polymers. The shape of the mask may define the shape of the unpolarized region. The mask may be left in place within the polarizer or may be removed from the polarizer during fabrication. Unpolarized regions may also be formed by light bleaching, chemical bleaching, and material removal techniques. Bleached areas may be chemically stabilized. A moisture barrier layer may be incorporated into the polarizer to help prevent the unpolarized region from reverting to a polarized state.

20 Claims, 19 Drawing Sheets

(56) References Cited

U.S. PATENT DOCUMENTS

| | | |
|---|---|---|
| 2004/0246580 A1 | 12/2004 | Sahouani et al. |
| 2005/0100690 A1 | 5/2005 | Mayer et al. |
| 2005/0163977 A1* | 7/2005 | Miyatake ................. G02B 1/11 428/195.1 |
| 2006/0001808 A1* | 1/2006 | Shinohara ............ G02B 5/3041 349/122 |
| 2012/0106063 A1* | 5/2012 | Mathew ............ G02F 1/133528 361/679.21 |
| 2013/0265708 A1 | 10/2013 | Mathew et al. |

* cited by examiner

ELECTRONIC DEVICE DISPLAY WITH POLARIZER WINDOWS

This application is a division of U.S. patent application Ser. No. 14/075,419, filed Nov. 8, 2013, which is hereby incorporated by reference herein in its entirety. This application claims the benefit of and claims priority to U.S. patent application Ser. No. 14/075,419, filed Nov. 8, 2013.

BACKGROUND

This relates generally to electronic devices and, more particularly, to electronic devices with displays.

Electronic devices often include displays. For example, cellular telephones, computers, and televisions have displays.

It can be challenging to mount light-based electronic components such as cameras and sensors in devices with displays. Some devices have large inactive display areas covered with protective bezels. In this type of device, a component such as a camera can be mounted under a camera window in the bezel. Although this type of arrangement will allow the camera to operate satisfactorily, the use of the bezel on the display may be unattractive and bulky. More compact and aesthetically appealing display designs are possible by mounting components in alignment with windows formed directly within an inactive border of the display. Such windows may, however, have unsightly edges or may contain polarizer material that can interfere with component performance.

It would therefore be desirable to be able to provide electronic devices with improved arrangements for accommodating components in displays.

SUMMARY

An electronic device may be provided with a display. The display may have a polarizer. The polarizer may have an unpolarized region. The unpolarized region may overlap some or all of the inactive area in the display. The unpolarized region may, for example, overlap text, graphics, or other content in the inactive area or may form part of a transparent window for a light-based component such as a camera, light sensor, or light emitting component.

A display polarizer may have a polymer layer. The polymer layer may have a portion that is covered with a dichroic dye to form a polarized region and may have a portion that is free of dichroic dye and that therefore forms an unpolarized region.

The shape of the unpolarized region may be defined by masking the polymer layer during the dye coating process. Masks may be formed from polymers such as photoresist. A mask may be left in place within a polarizer or may be removed from the polarizer during fabrication. Unpolarized regions may also be formed by light bleaching, chemical bleaching, and polarizer material removal techniques such as mechanical and laser cutting techniques. Bleached areas may be chemically stabilized. Cut areas may be backfilled with index matching polymer. A moisture barrier layer may be incorporated into the polarizer to improve reliability.

DETAILED DESCRIPTION

Electronic devices may be provided with displays. The displays may include polarizers. To create an appealing appearance for the display, the display may be mounted in a housing in a way that minimizes the use of bulky bezel structures. Transparent unpolarized regions may be formed in an inactive border of the display. The unpolarized regions may be formed using chemical bleaching of polarizer material, light bleaching, polarizer film removal, masking techniques, other fabrication techniques, or combinations of these techniques. Chemical stabilization and moisture barrier structures may help enhance reliability.

Illustrative electronic devices of the types that may be provided with displays having polarizers with unpolarized regions are shown in FIGS. 1, 2, 3, and 4.

Figure 1:
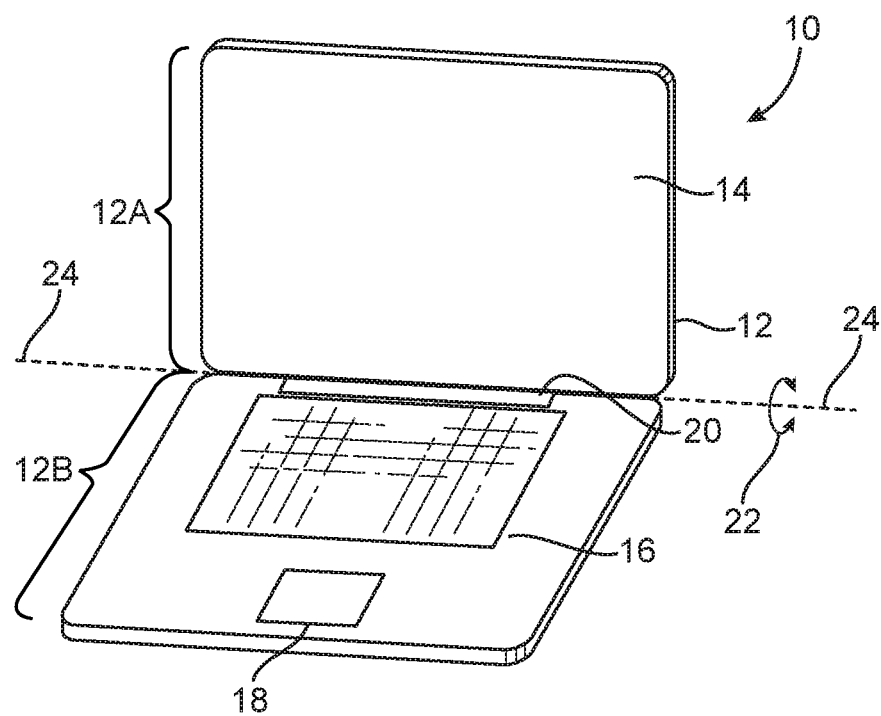
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
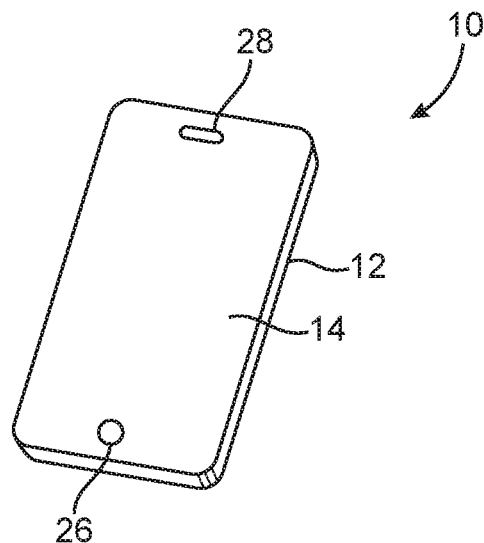
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
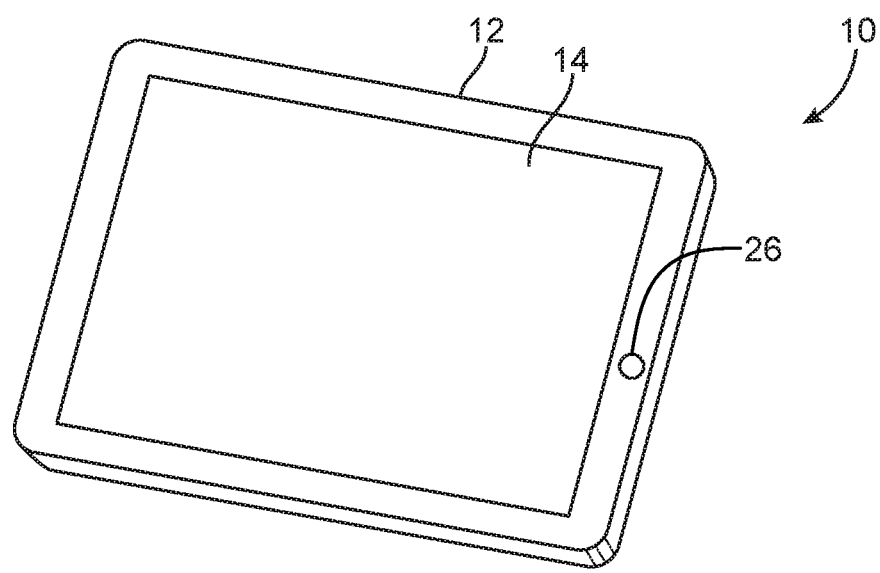
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
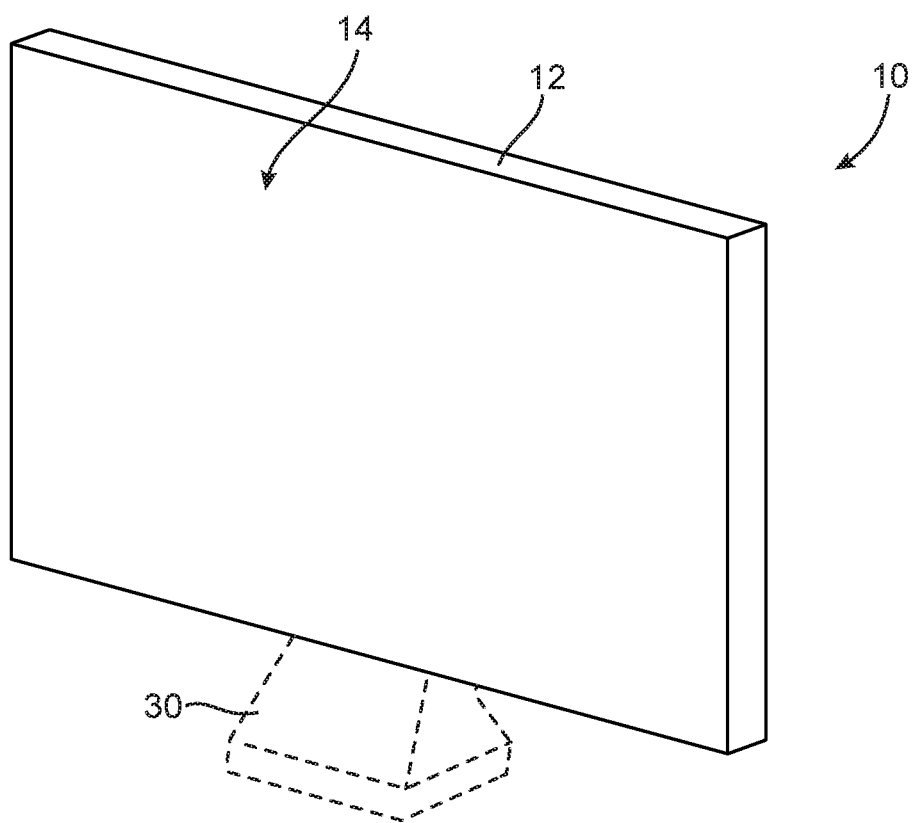
FIG. 4 is a perspective view of an illustrative electronic device such as a display for a computer or television with display structures in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table top or desk.

Display 14 may be a liquid crystal display, an organic light-emitting diode display, a plasma display, an electrophoretic display, an electrowetting display, a display using other types of display technology, or a display that includes display structures formed using more than one of these display technologies. Display 14 may include one or more polarizers. For example, an organic light-emitting diode display may include a circular polarizer, a liquid crystal display may have upper and lower polarizers, etc. Configurations for display 14 in which display 14 is a liquid crystal display are sometimes described herein as an example. This is merely illustrative. Display 14 may be formed using any suitable type of display technology.

Figure 5:
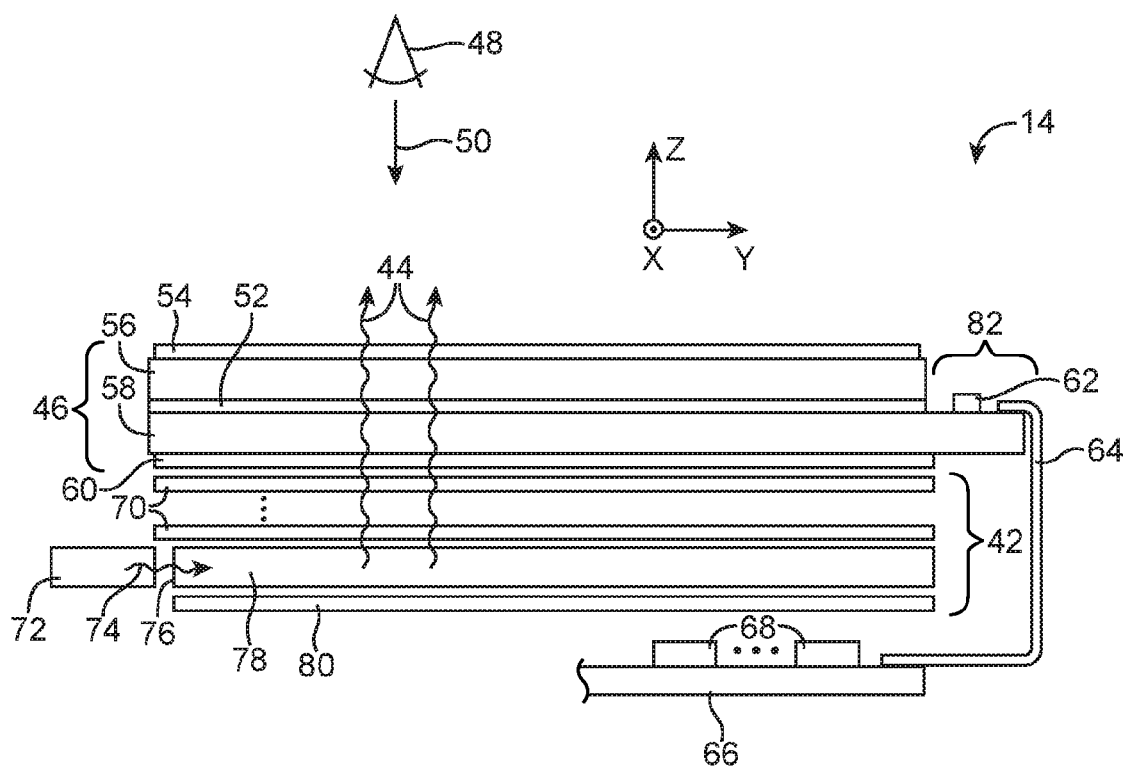
FIG. 5 is a cross-sectional side view of an illustrative display in accordance with an embodiment.

A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62 using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6A:
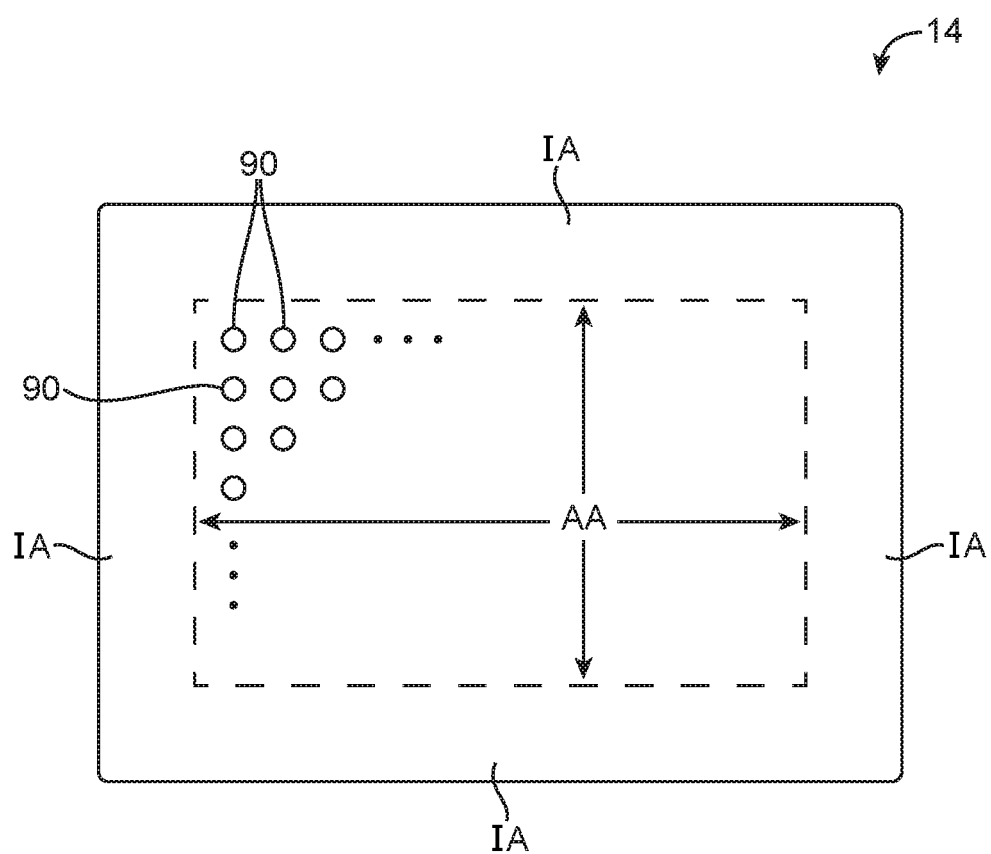
FIG. 6A is a front view of an illustrative display in accordance with an embodiment.

As shown in FIG. 6A, display 14 may be characterized by an active area such as active area AA. Active area AA may include an array of display pixels 90. Display pixels 90 may be used in displaying images to viewer 48 (FIG. 5) during operation of device 10. An inactive border region such as inactive area IA may surround the periphery of active area AA. For example, in a configuration of the type shown in FIG. 6A in which active area AA has a rectangular shape surrounded by four peripheral edges, inactive region IA may have the shape of a rectangular ring that runs along each of the four peripheral edges of active area AA and thereby surrounds active area AA. Displays with different active area and inactive area shapes may be used if desired. The configuration of FIG. 6A is merely illustrative.

Device 10 may include light-based components such as a camera (digital image sensor), an ambient light sensor, a light-based proximity sensor (e.g., a sensor having a light emitter and corresponding light detector), status indicator lights, etc. These components may be mounted under display 14 in inactive area IA. Transparent window regions may be formed in display 14 to accommodate the light-based components. The window regions may be free from polarized material. For example, upper polarizer 54 of FIG. 5 may be provided with transparent regions that are unpolarized and that therefore exhibit high transmittance (e.g., 80% or more, 90% or more, etc.). The electrical components that are overlapped by inactive area IA can be mounted in alignment with these unpolarized regions.

Figure 6B:
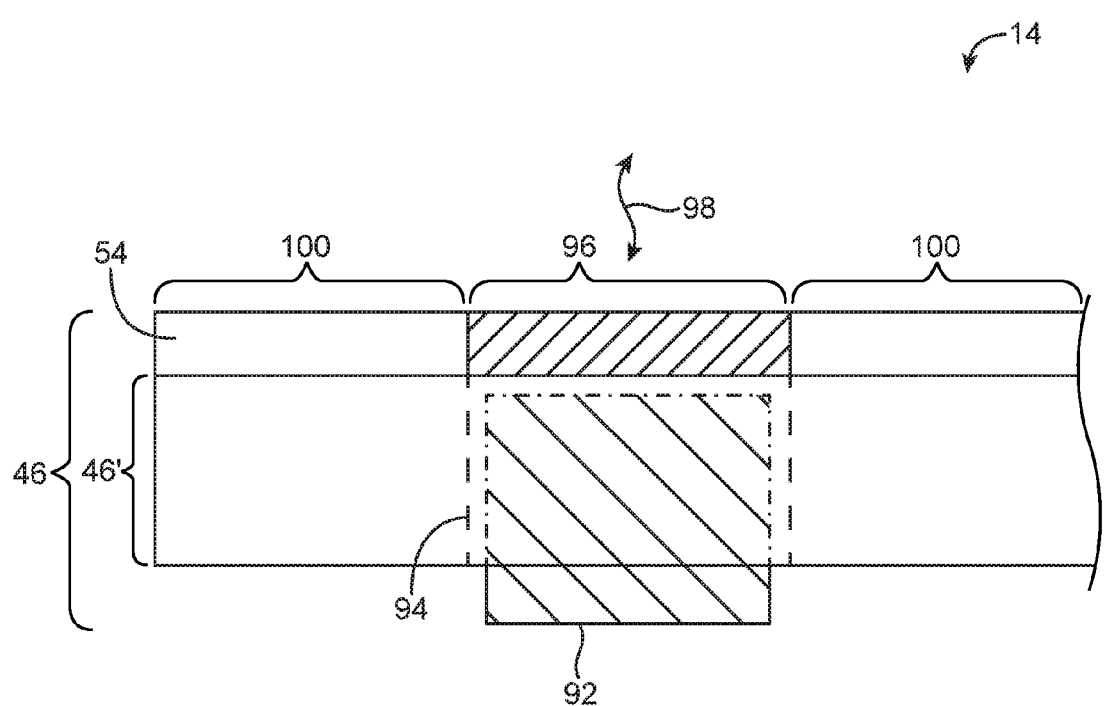
FIG. 6B is a cross-sectional side view of a polarizer window in alignment with a light-based component in accordance with an embodiment.

A cross-sectional side view of a portion of an illustrative display that has a polarizer with an unpolarized window is shown in FIG. 6B. As shown in FIG. 6B, display 14 may include display layers 46 (see, e.g., display layers 46 of FIG. 5). Display layers 46 may include display layers 46' (e.g., a color filter layer, a thin-film transistor layer, a lower polarizer, etc.). Display layers 46 may also include upper polarizer 54. Polarizer 54 may have polarized regions such as regions 100 and an unpolarized region such as region 96 that is free of polarizing material and that therefore may form a transparent window for display 14. Light-based component 92 (i.e., a camera, a light sensor, a light emitter, or other component) may be mounted in alignment with unpolarized region 96. For example, component 92 may be mounted under region 96 so that incoming and/or outgoing light 98 that is associated with the operation of component 92 may pass through region 96. If desired, light 98 may pass through one or more transparent layers in display layers 46'. For example, glass layers, plastic layers, or other layers of material among layers 46' may be interposed between component 92 and polarizer 54. If desired, an opening such as opening 94 may be formed in some or all of layers 46' (e.g., to allow component 92 to be mounted closer to polarizer 54).

In some displays, it may be desirable to incorporate a layer of opaque masking material around the periphery of the display. For example, some or all of inactive area IA of display 14 (FIG. 6A) may be provided with a layer of black ink, white ink, or other opaque masking material to hide internal device components from view by a user. When forming windows for light-based components, openings may be formed in the opaque masking material in alignment with unpolarized regions. If desired, unpolarized regions may also be formed over patterned or unpatterned opaque masking material or other opaque structures. For example, unpolarized regions such as region 96 of FIG. 6B may be formed over a logo in inactive area IA.

Figure 7:
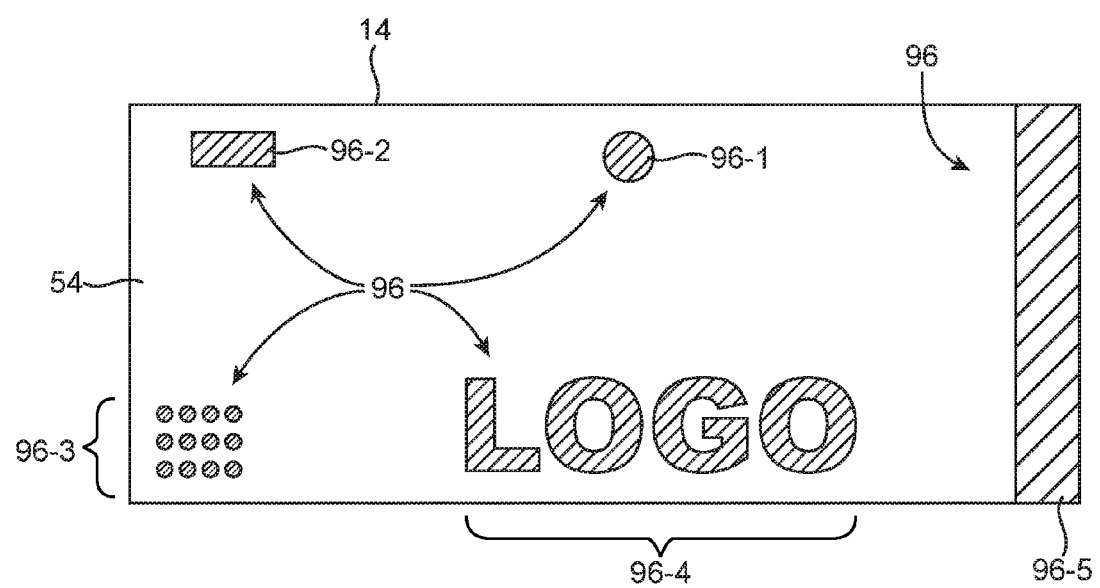
FIG. 7 is a front view of an illustrative display showing how polarizer windows of various shapes may be used in a display in accordance with an embodiment.

FIG. 7 is a top view of display 14 showing illustrative patterns of unpolarized regions 96 that may be optionally formed within polarizer 54 (i.e., in inactive area IA of display 14). As shown in FIG. 7, unpolarized regions 96 may include circular regions such as camera or sensor window 96-1, rectangular regions such as region 96-2 (e.g., a rectangular window for a proximity sensor, ambient light sensor, or status indicator light), arrays of multiple smaller unpolarized region such as array 96-3 (e.g., an array of circular regions or rectangular regions in which the density of unpolarized regions in the array controls overall light transmittance), text, graphics, logos, or other decorative or informative content such as logo 96-4, and border regions running along one, two, three, or four of the peripheral edges of display 14 such as illustrative right-hand border 96-5.

Unpolarized regions 96 of polarizer layer 54 may overlap transparent window openings through display layers 46' (e.g., to accommodate light 98 associated with component 92) and/or may overlap opaque layers of material (e.g., in association with creating a logo, an opaque border, etc.).

Figure 8:
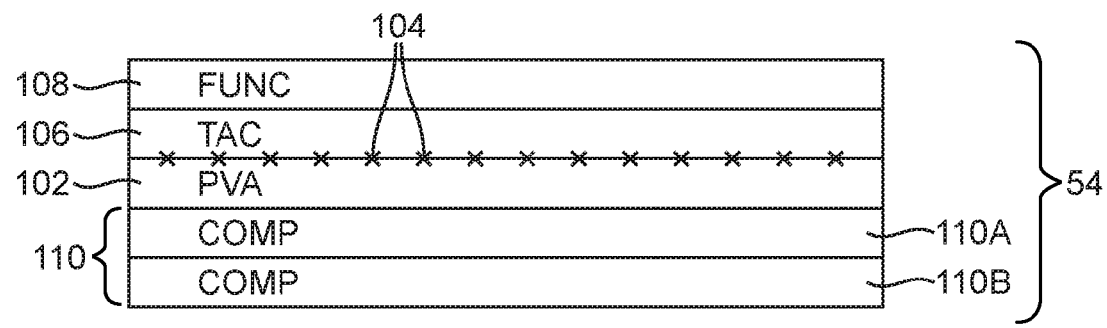
FIG. 8 is a cross-sectional side view of an illustrative polarizer in accordance with an embodiment.

A cross-sectional side view of an illustrative polarizer for display 14 is shown in FIG. 8. As shown in FIG. 8, polarizer 54 (i.e., an upper polarizer in this example) may have a polymer layer such as polarizer film (layer) 102. Film 102 may be formed from a stretched polymer such as stretched polyvinyl alcohol (PVA) and may therefore sometimes be referred to as a PVA layer. A dichroic dye such as iodine 104 or dichroic organic pigments may be placed on the stretched PVA film to provide polarizer 54 with the ability to polarizer light. When layer 102 is coated with iodine 104, iodine molecules align with the stretched film and form the polarizer. Other polarizer films may be used if desired. Polarizer film 102 may be sandwiched between other polymer layers. For example, the upper portion of layer 102 may be covered with one or more layers such as protective layer 106 and functional layer 108. Layer 106 may be formed from a clear polymer. For example, layer 106 may be formed from a material such as tri-acetyl cellulose (TAC) and may sometimes be referred to as a TAC film. The TAC layer or other supporting substrate may help support and protect the PVA film. Functional layer 108 may include one or more layers of organic and/or inorganic material that serve as an anti-reflection coating, antismudge coating, or antiscratch coating, or may have layers that serve two or more such functions. Other films may be laminated to film 102 if desired. For example, lower film(s) 110 may be formed from one or more compensation films 110A and 110B (i.e., birefringent films such as cyclic olefin polymer films that help enhance off-axis viewing performance for display 14). Interposed adhesive layers may be used to hold some or all of the layers of material in polarizer 54 and other portions of display 14 together.

The presence of polarizer material over the entire surface of display 14 may create challenges in forming desired border regions and in mounting components behind display 14. For example, it may be desirable to mount components such as a camera, ambient light sensor, light-based proximity sensor, or other light-based components 92 under unpolarized portion 96 of polarizer 54. This allows the components to be hidden from view while using light that passes through the surface of display 14. In the presence of polarizer material, light transmittance is generally cut in half. The reduced amount of light that would reach a camera, light sensor, or other light-based component in this type of arrangement would tend to decrease component performance (e.g., low-light camera and sensor performance would be degraded). This challenge can be addressed by forming an unpolarized area in polarizer 54 such as illustrative unpolarized area 96 of FIG. 6B. The unpolarized area may be used in forming a light window such as a camera window or light sensor window in display 14 that is not subject to transmission losses due to polarizer material. The unpolarized area may also be used to cover text, graphics, or other content for which the light reduction associated with the polarized area of the polarizer is not desired. This content (e.g., text, graphics, etc.) may be formed using printed ink patterns (e.g., white, black, gray, colored, etc.), patterned metal, or other visible structures.

Figure 9:
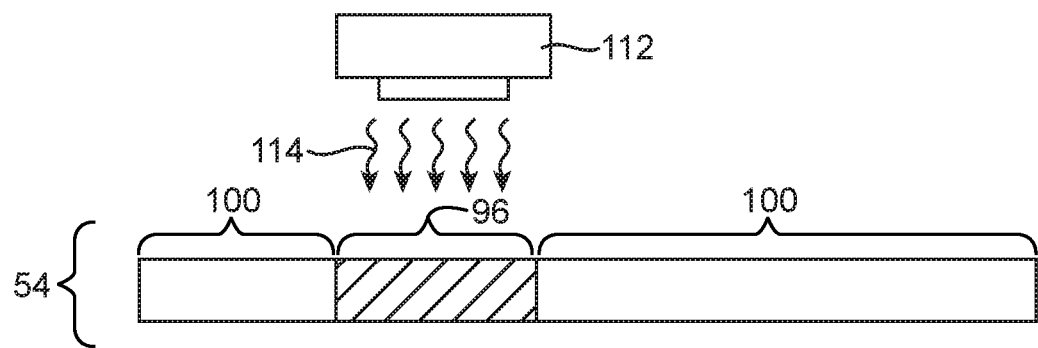
FIG. 9 is a cross-sectional side view of a polarizer layer that is being exposed to light to form an unpolarized region in accordance with an embodiment.
Figure 10:
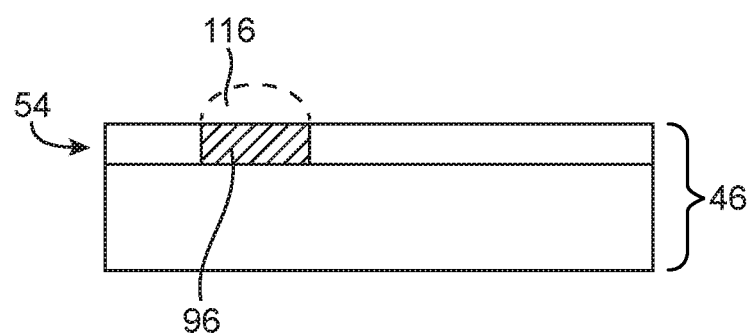
FIG. 10 is a diagram showing how the unpolarized window region of FIG. 9 may be chemically treated in accordance with an embodiment.

To eliminate the polarization properties of polarizer 54 and thereby form unpolarized region 96, selected portions of polarizer 54 may be patterned by applying light, by applying chemicals, by physically removing polarizer material, by using masking techniques during polarizer formation, or using other polarizer patterning techniques. As shown in FIG. 9, for example, light source 112 may produce light 114. When light 114 strikes the iodine or other dichroic dye on the surface of the polarizer, light 114 disrupts the dye sufficiently to prevent the dye from polarizing light. If desired, chemical treatment with chemical 116 (FIG. 10) may be used after light bleaching polarizer 54 in this way. Chemical 116 may be, for example, an iodine cleaning agent such as sodium thiosulfate that prevents the disrupted iodine from reforming into its unbleached state (i.e., chemical 116 may chemically stabilize the bleached area).

Figure 11:
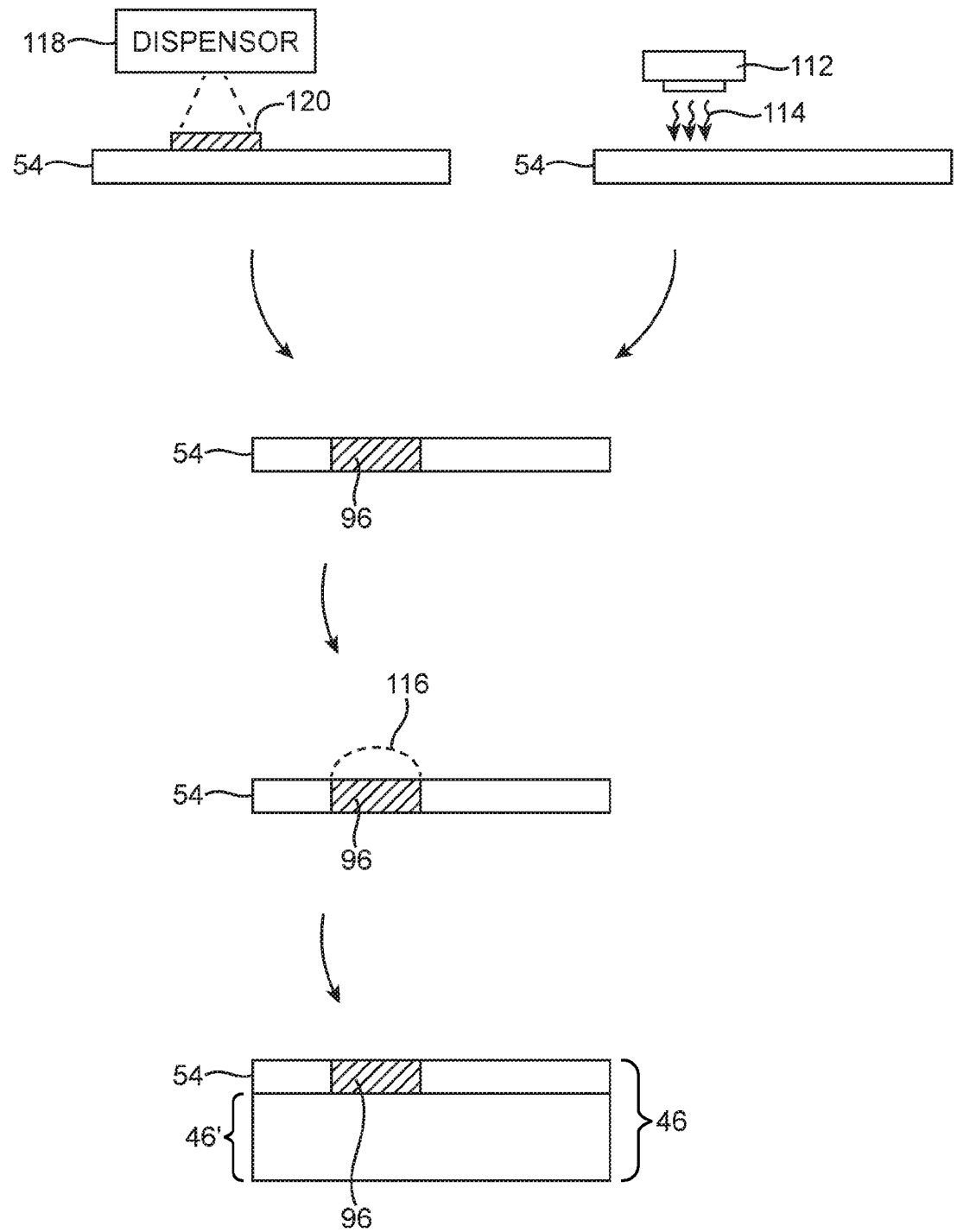
FIG. 11 is a diagram of a system being used to form a display having a polarizer layer with an unpolarized region in accordance with an embodiment.

If desired, chemical bleaching may be used to form unpolarized areas on polarizer 54. As shown in FIG. 11, for example, dispenser 118 (e.g., a screen printing apparatus, a needle dispenser, an ink-jet printer, a gravure printing device, a pad printing device, a roller printing device, or other equipment) may be used to dispense bleaching agent 120 onto the surface of polarizer 54. Bleaching agent 120 may be a chemical such as a strong base (e.g., KOH) that disrupts the polarization properties of the polarizer material on layer 54, thereby forming unpolarized region 96. After forming region 96 (by chemical treatment with chemical 120 and/or light bleaching using light 114 from light source 112), chemical stabilizer 116 (e.g., sodium thiosulfate, etc.) may optionally be applied over unpolarized region 96. Polarizer 54 may then be stacked with layers 46' above and/or below polarizer 54 to form display layers 46 for display 14.

If desired, masking techniques can be used to create unpolarized area 96, as illustrated in connection with FIGS. 12, 13, 14, 15, and 16.

Figure 12:
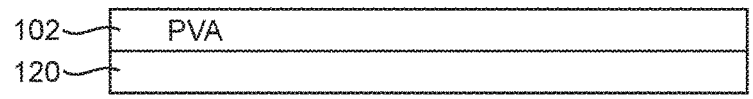
FIGS. 12, 13, 14, 15, and 16 are cross-sectional views of structures produced by using a patterned mask to form a display with a polarizer window in accordance with an embodiment.

Initially, polarizer layer 102 (e.g., a stretched PVA layer having a thickness of a few microns to 30 microns or other suitable thickness) may be mounted to a base layer such as base 120, as shown in FIG. 12. Base layer 120 may be a polymer layer such as a TAC layer.

Figure 13:
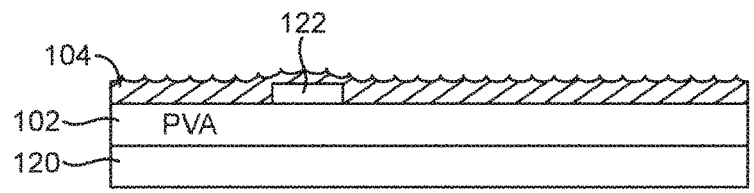

As shown in FIG. 13, patterned masking material 122 may be formed on the surface of PVA layer 102. The masking material is deposited in areas that are to be free of polarizing material. The areas in which polarizing dye is to serve as a polarizing material for polarizer 54 are free from masking material 122.

Masking material 122 may be a material such as a photoimageable polymer (e.g., photoresist that is patterned by application of ultraviolet light), may be a polymer that is deposited in a desired pattern using ink-jet printing, screen printing, roll-based printing, etc., or may be other patterned mask material that is not readily dyed to create polarizing material upon exposure to dye 104. After forming masking material 122, dichroic dye 104 (e.g., iodine) may be used to cover the exposed upper surface of PVA layer 102. Masking layer 122 may prevent dye 104 from reaching the upper surface of PVA layer 102 in selected area(s). Base layer 120 may prevent the dye from reaching the lower surface of PVA layer 102.

Figure 14:
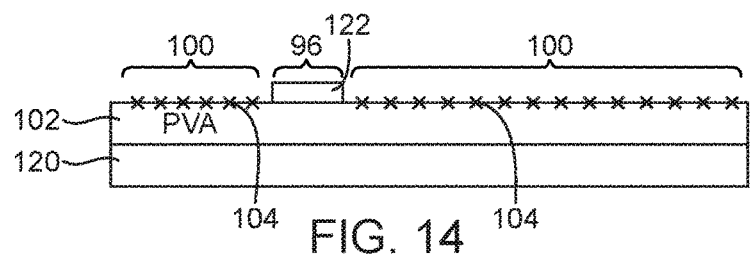
Figure 15:
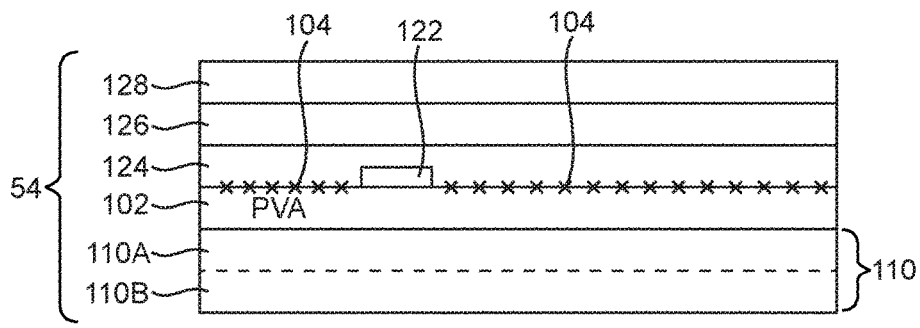

This process results in a polarizer layer such as layer 102 that is selectively covered with polarizer 104 to produce polarized portions 100 (i.e., portions that contain polarizing material such as dye) and unpolarized portion 96 (i.e., portions that are free of polarizing material such as dye), as shown in FIG. 14. FIG. 15 shows how an adhesive layer such as adhesive layer 124 may cover patterned layer 104 and mask 122 on the upper surface of layer 102. Additional layers such as layers 126 and 128 may be attached to the upper surface of PVA layer 102 using adhesive 124. Layer 126 may be a protective polymer such as a TAC layer. Layer 128 may be a functional coating such as an antireflection layer. Other layer(s) may be formed on top of layer 102 if desired (e.g., one or more layers with antireflection properties, antismudge properties, antiscratch properties, antireflection properties, and/or protection properties or other properties). Base film 120 can be removed, if desired, and replaced with layers such as layers 110 (e.g., one or more compensation layers such a layers 110A and 110B). A layer of adhesive on the lower surface of layer 102 and/or interposed adhesive layers between layers 110A and 110B may be used in attaching layers 110 to layer 102. The inclusion of one or more additional layers on the top and/or bottom of layer 102 may serve to complete the formation of a polarizer layer such as upper polarizer 54.

Figure 16:
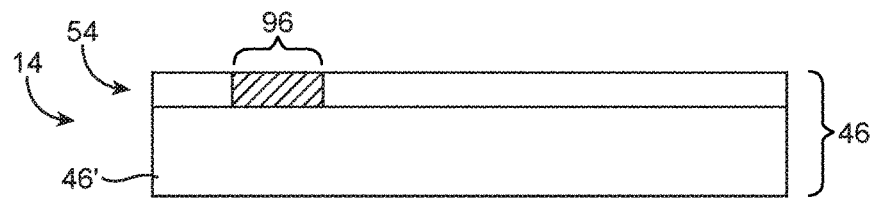

FIG. 16 shows how upper polarizer 54 and its unpolarized portion 96 may be mounted on display layers 46' (e.g., a color filter layer, a thin-film transistor layer, etc.) to form display 14.

FIGS. 17, 18, 19, 20, and 21 illustrate how masking material 122 may be removed as part of a mask-based process for forming a polarizer with a patterned unpolarized region.

Figure 17:
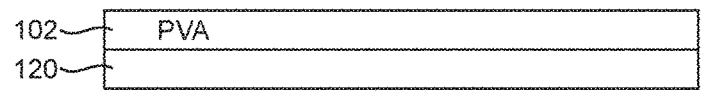
FIGS. 17, 18, 19, 20, and 21 are cross-sectional views of structures produced by using a removable patterned mask to form a display with a polarizer window in accordance with an embodiment.

FIG. 17 shows how PVA layer 102 may be attached to base layer 120.

Figure 18:
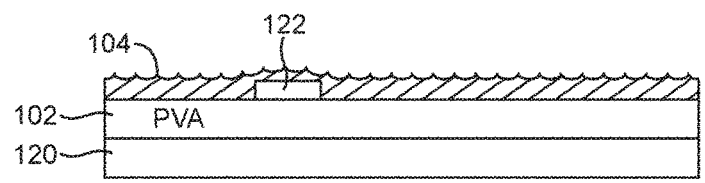

FIG. 18 shows how mask 122 may be patterned on the surface of PVA layer 102 and how dye 104 may be used to coat the uncovered portions of the upper surface of PVA layer 102.

Figure 19:
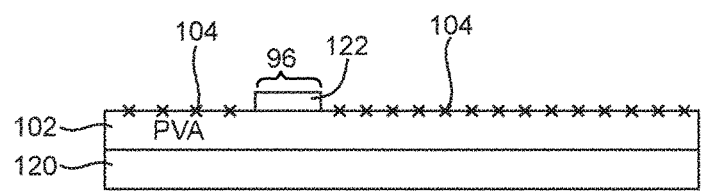

As shown in FIG. 19, the presence of masking structure 122 prevents dye 104 from forming polarizer 54 in region 96. The presence of base layer 120 on the lower surface of PVA layer 102 may help prevent dye from dying the lower surface of layer 102.

Figure 20:
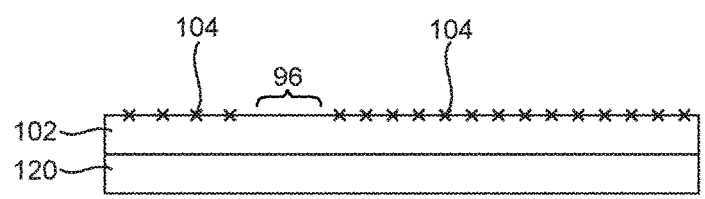

As shown in FIG. 20, masking structure 122 can be removed, leaving unpolarized region 96 on the surface of layer 104.

Figure 21:
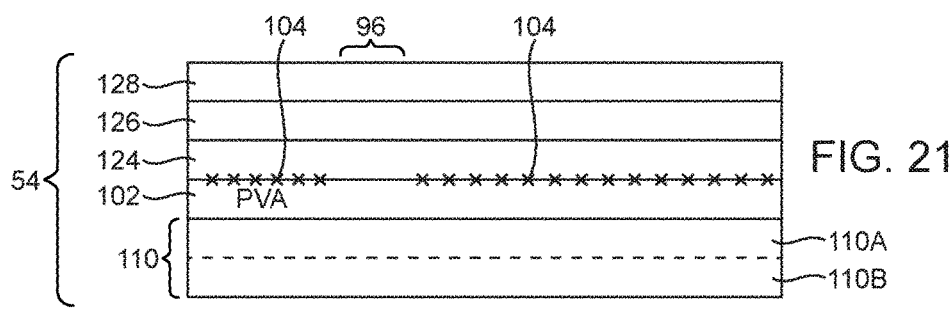

FIG. 21 shows how base layer 120 may be removed, adhesive layer 124 may be used to attach addition layer(s) such as layer 126 (e.g., a TAC layer), optional additional layer 128 (e.g., a functional layer such as an antireflection layer, etc.) may be formed on layer 126, and one or more additional layers 110 may be attached to the lower surface of PVA layer 102 (e.g., using layers of adhesive), thereby forming polarizer 54. In this scenario, masking structure 122 was removed prior to the addition of layers such as layers 124, 126, 128, and 110, so polarizer 54 does not contain residual masking material. However, unpolarized region 96 remains in polarizer 54, due to the absence of dye 104 within region 96.

Figure 22:
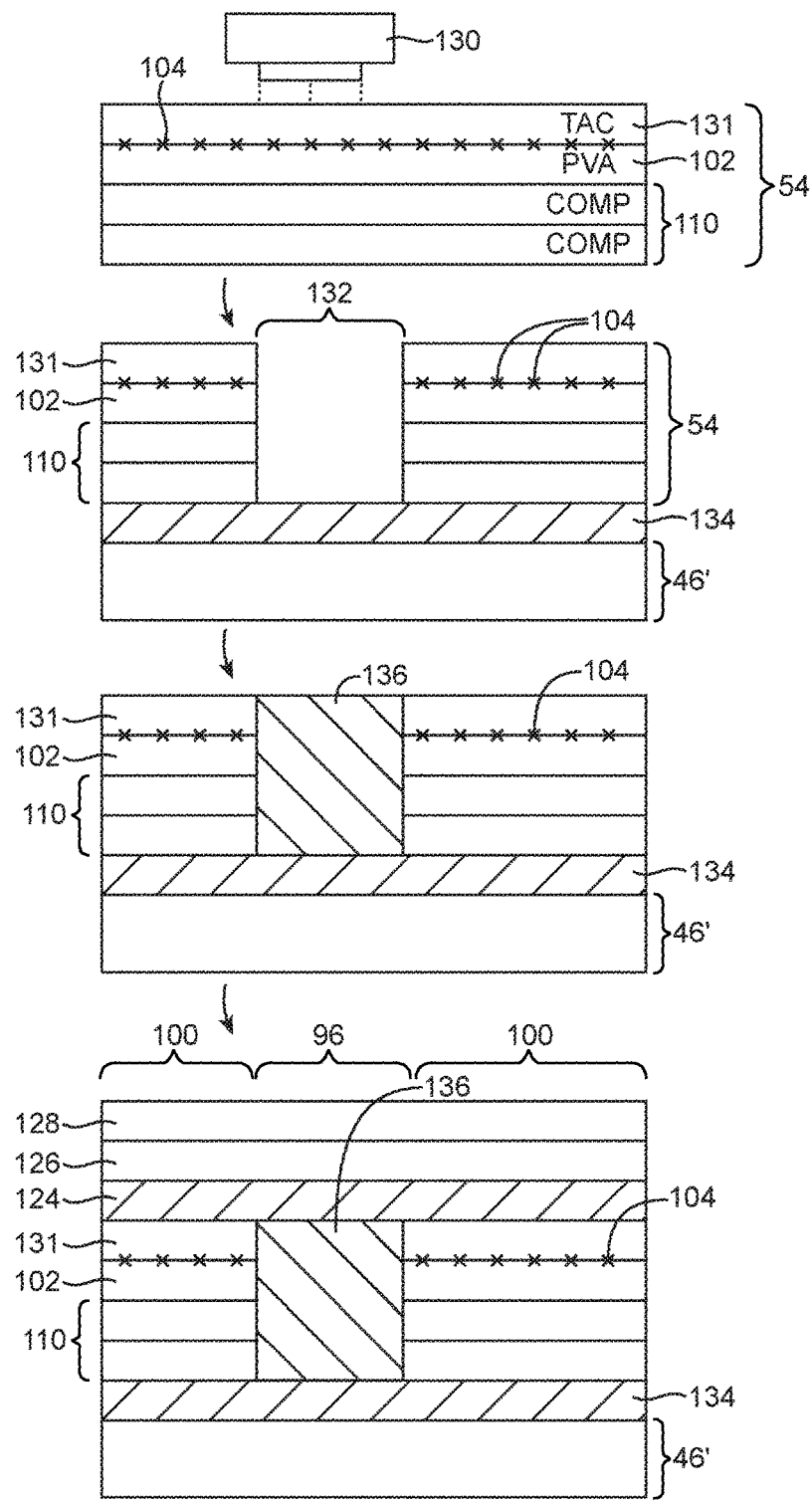
FIG. 22 shows how a polarizer window may be formed by removing polarizer material and filling the resulting void with transparent material in accordance with an embodiment.

If desired, polarizer material may be removed from polarizer 54 to form unpolarized region 96. This type of arrangement is illustrated in FIG. 22. As shown in FIG. 22, polarizer 54 may have layers such as PVA layer 102 coated with dye 104, compensation layers 110, and TAC layer 131. Material removal tool 130 (e.g., a mechanical punch, a laser cutting tool, or other equipment for physically removing part of polarizer 54) may be used to form opening 132 in polarizer 54. Polarizer 54 may be attached to display layers 46' using adhesive 134. Transparent polymer material 136 (e.g., ultraviolet light curable adhesive) may be used to fill opening 132. Material 136 may have an index of refraction that is matched to the index of refraction of surrounding layers to help reduce reflections (i.e., material 136 may be index matched to layers 110, 102, and 131). Additional layers such as adhesive layer 124, TAC layer 126, and functional layer 128 (e.g., an antireflection layer) may then be formed over the upper surface of PVA layer 126 and the exposed upper surface of material 136. Due to the presence of material 136 in opening 132, the surface of polarizer 54 will be smooth (i.e., there will not be a noticeable bump on the surface of polarizer 54 at the interface between region 96 and regions 110).

Figure 23:
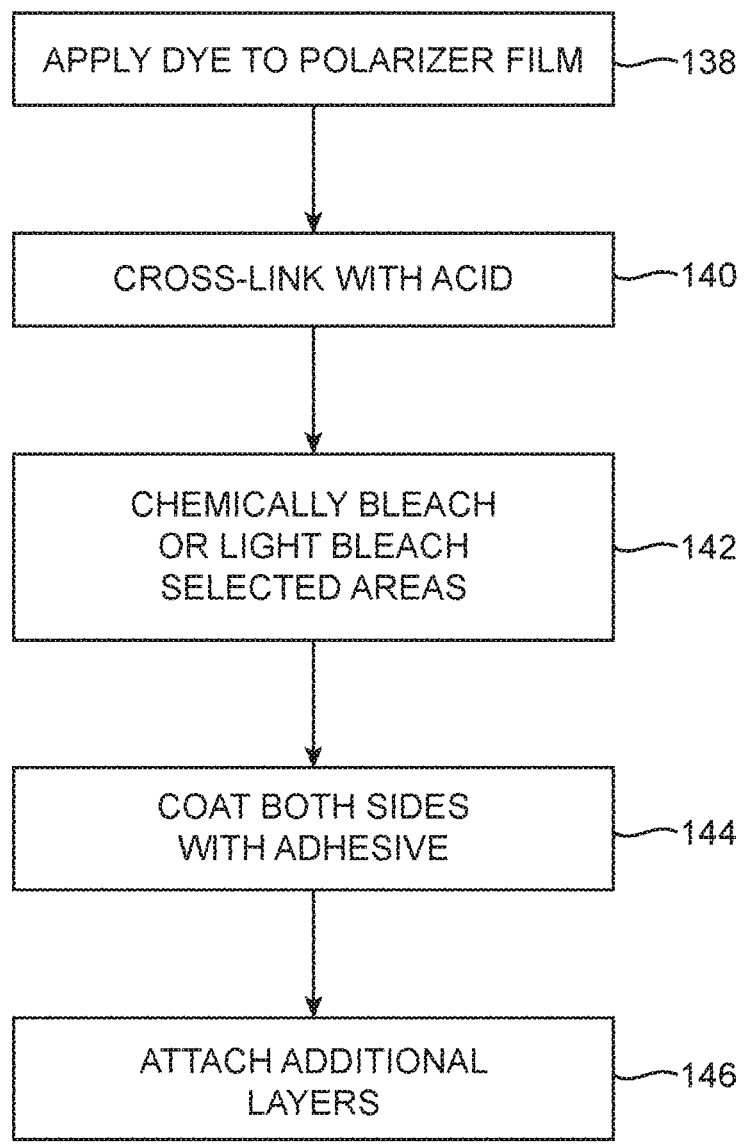
FIG. 23 is a flow chart of steps involved in forming an unpolarized region on a polarizer using chemical bleaching operations in accordance with an embodiment.

FIG. 23 is a flow chart of illustrative steps involved in using a dye bleaching arrangement to form unpolarized region 96.

At step 138, a dichroic dye such as iodine may be applied to a polarizer substrate such as a stretched PVA layer.

At step 140, the stretched PVA layer coated with iodine may be treated with an acid such as boric acid to initiate cross-linking.

At step 142, a strong base such as potassium hydroxide or other bleaching agent may be applied to a selected portion of the surface of the coated stretched PVA layer, bleaching the dye in the selected portion, and thereby forming unpolarized region 96. A chemical stabilizer may optionally be applied to chemically stabilize the unpolarized region 96.

At step 144, coatings of adhesive may be applied to the upper and lower surfaces of the PVA layer.

Additional layers of polarizer 54 and additional display layers 46 may be attached to the PVA layer at step 146. For example, a TAC layer and an antireflection coating or other functional layer may be attached to the upper surface of the PVA layer and compensation layers 110 or other layers may be attached to the opposing lower surface of the PVA layer.

Figure 24:
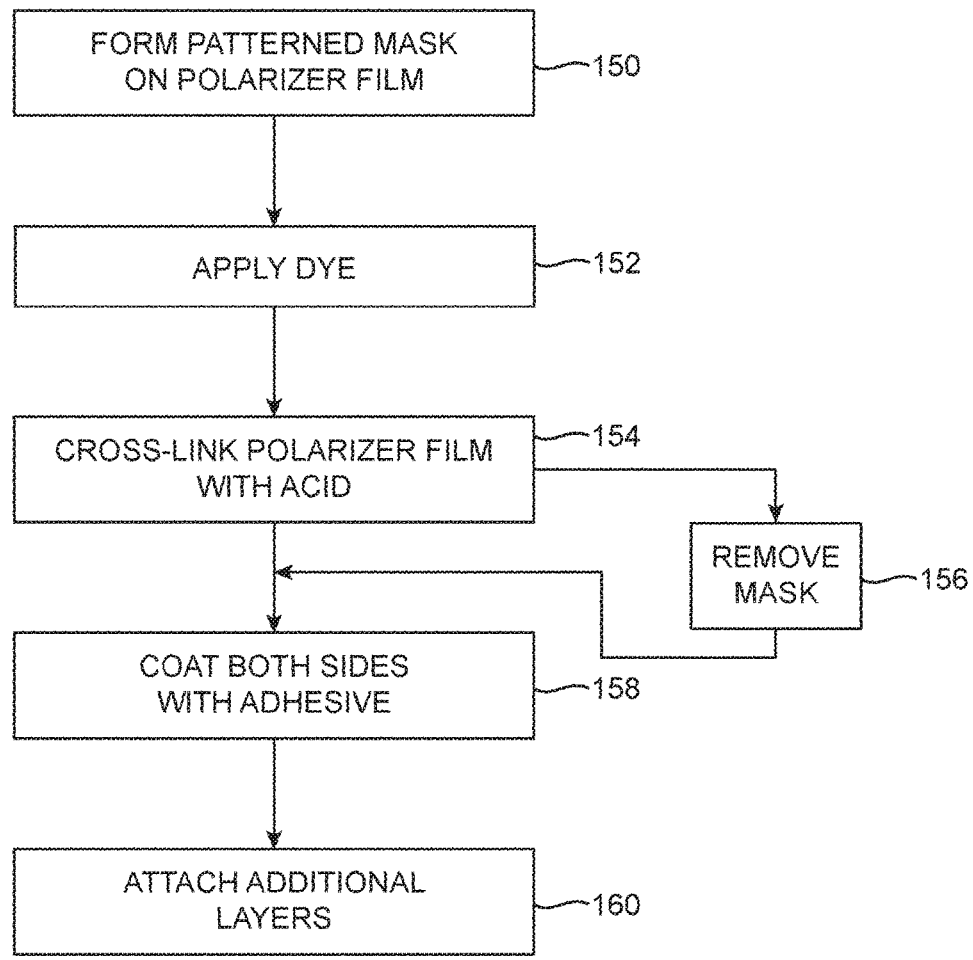
FIG. 24 is a flow chart of illustrative steps involved in forming an unpolarized region on a polarizer using masking techniques in accordance with an embodiment.

FIG. 24 shows illustrative steps involved in forming a polarizer with unpolarized regions using masking techniques.

At step 150, a patterned mask may be formed on a substrate such as stretched PVA layer 102. The patterned mask may be a polymer. The polymer may be patterned using photolithographic techniques, using ink-jet printing, pad printing, screen printing, roll-based printing processes, or other patterning techniques. A base film may be attached to the lower surface of the PVA layer.

At step 152, a dichroic dye such as iodine may be applied to PVA layer 102. The base film on the lower surface of PVA layer 102 prevents the dye from coating the lower surface of layer 102. The patterned mask on the upper surface of PVA layer 102 prevents the dye from coating the masked portion of the upper surface of PVA layer 102, which therefore forms unpolarized region 96. The remaining (unmasked) portions of PVA layer 102 are coated with the dye and become polarizing.

At step 154, cross-linking may be promoted by applying an acid such as boric acid.

If desired, the mask may be removed at step 156.

At step 158, the base layer may be optionally removed and the opposing upper and lower surfaces of PVA layer 102 may be coated with adhesive.

Additional layers (e.g., a TAC layer and functional layer on the top and compensation layers on the bottom) may be attached to the PVA layer at step 160 to form polarizer 54 with unpolarized region 96.

During masking operations, an ink-jet printer may deposit liquid polymer masking material such as ultraviolet-light curable polymer or heat curable polymer at a resolution of less than 200 dots per inch, a resolution of more than 200 dots per inch, or other suitable resolution. One or more passes of the ink-jet printer or other deposition equipment may be made to ensure adequate masking layer coverage. If desired, a waiting time (e.g., 1 second or more, 10 seconds or more, 100 seconds or more, or 1000 seconds or more) may be imposed between the initial deposition of the liquid polymer and the initiation of curing operations by application of ultraviolet light, an electron beam, and/or heat. The waiting time may help ensure that the individual dots of polymer that are deposited as part of the ink-jet deposition process have sufficient time to flow and merge with each other to form mask 122. The masking material that is used in forming mask 122 may contain organic solvents and/or water. If desired, an ink that is free from solvent may be used as the masking material and PVA layer 102 may be maintained at a sufficiently high temperature to allow the deposited ink dots to spread and flow into each other to form mask 122.

Unpolarized region 96 has different optical properties than polarized region 100 such as different transmission levels, different colors, different amounts of haziness, different polarizations (i.e., polarized and unpolarized), etc. Unpolarized region 96 may be aligned with transparent window structures to form light windows (i.e., unpolarized windows) in polarizer 54. Unpolarized regions 06 may also overlap content such as text, graphics, icons, logos, and other content. In this type of scenario, the underlying structures that give rise to the content may be formed from colored dyes (e.g., red ink, blue ink, green ink, etc.), may be formed from metal, may be formed from black or white structures, etc.

When unpolarized region 96 is formed by light and/or chemical bleaching (with or without optional chemical stabilization), there may be a tendency of the residual material in the unpolarized region to reform into a polarizing material. This process can be accelerated in the process of moisture. To enhance the reliability of the polarizer (i.e., to ensure that the unpolarized region 96 will be maintained in its desired unpolarized state), one or more moisture barrier layers may be incorporated into display 14. Moisture barrier layers may be formed from structures that exhibit low values of water vapor transmission rate (WVTR). For example, a moisture barrier layer may exhibit a WVTR value of less than $10^{-2}$ g/m$^2$-day, of less than $10^{-3}$ g/m$^2$-day, or other suitable value indicative of good moisture blocking.

Examples of materials that may be used in forming a moisture barrier layer include inorganic materials such as silicon oxide and aluminum oxide. A moisture barrier layer may be formed from multiple stacked inorganic layers such as these. Inorganic moisture barrier layers may be formed with a low density of microcracks that might otherwise allow moisture to penetrate an inorganic stack such as conventional antireflection coating (i.e., a conventional antireflection coating formed from alternating high and low index of refraction materials).

Moisture barrier layer may be formed from diamond-like coatings (e.g., a diamond-like coating coated on a substrate in a parallel plate reactor). A diamond-like coating may be formed from a material such as silicon oxide or aluminum oxide. If desired, diamond-like coatings may be deposited in the presence of carbon or nitrogen to tune the index of refraction of the diamond-like coating so that the diamond-like coating is index matched to nearby polymer layers.

If desired, moisture barriers may be formed from one or more layers of glass (e.g., a layer of glass having a thickness of 50 to 200 microns).

Moisture barrier films that are formed from moisture barrier coatings on polymer carriers and moisture barrier layers formed from a layer of glass may be attached to other display layers using adhesive. Moisture barrier films may also be deposited on display layers without using adhesive. For example, moisture barrier coatings can be deposited directly on a PVA layer or other display layers.

Figure 25:
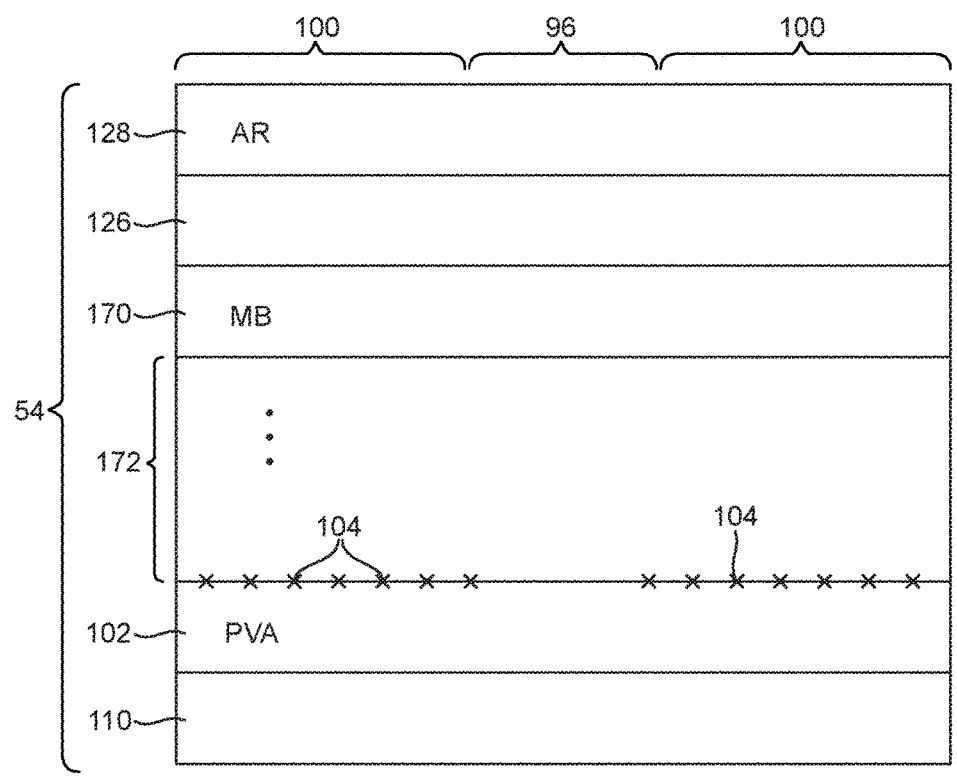
FIG. 25 is a cross-sectional side view of a polarizer that includes a moisture barrier to help enhance the reliability of an unpolarized region in accordance with an embodiment.

An illustrative polarizer of the type that may be provided with a moisture barrier layer to enhance reliability is shown in FIG. 25. Polarizer 54 has a polarizer film such as stretched PVA layer 102 coated with dichroic dye such as iodine 104. Antireflection layer 128 (or other functional layer) may be supported by carrier layer 126 (e.g., a TAC layer or a layer of other clear polymer). Regions 100 of polarizer 54 in FIG. 25 contain dye 104 and are polarizing. Region 96 is free of dye 104 and is therefore unpolarized. To prevent moisture from entering polarizer 54 and causing the residual material in region 96 from returning to a polarizing state, one or more moisture barrier layers such as moisture barrier layer 170 may be incorporated into polarizer 54. As indicated by optional layers 172, polarizer 54 may contain other layers of material (e.g., protective layers such as TAC layers, functional layers, etc.). Additional layer(s) 172 may be formed above or below PVA layer 102 and/or above or below moisture barrier layer 170. The moisture blocking functionality of moisture barrier 170 may be particularly effective in scenarios in which the distance between moisture barrier layer 170 and PVA layer 102 (and dye layer 104) is minimized (i.e., scenarios in which moisture barrier layer 170 is adjacent to the upper surface of PVA layer 102 or is separated from moisture barrier layer 170 by only one, two, or other small number of intervening layers). Adhesive may be interposed between adjoining layers when layers are laminated together to form polarizer 54.

Figure 26:
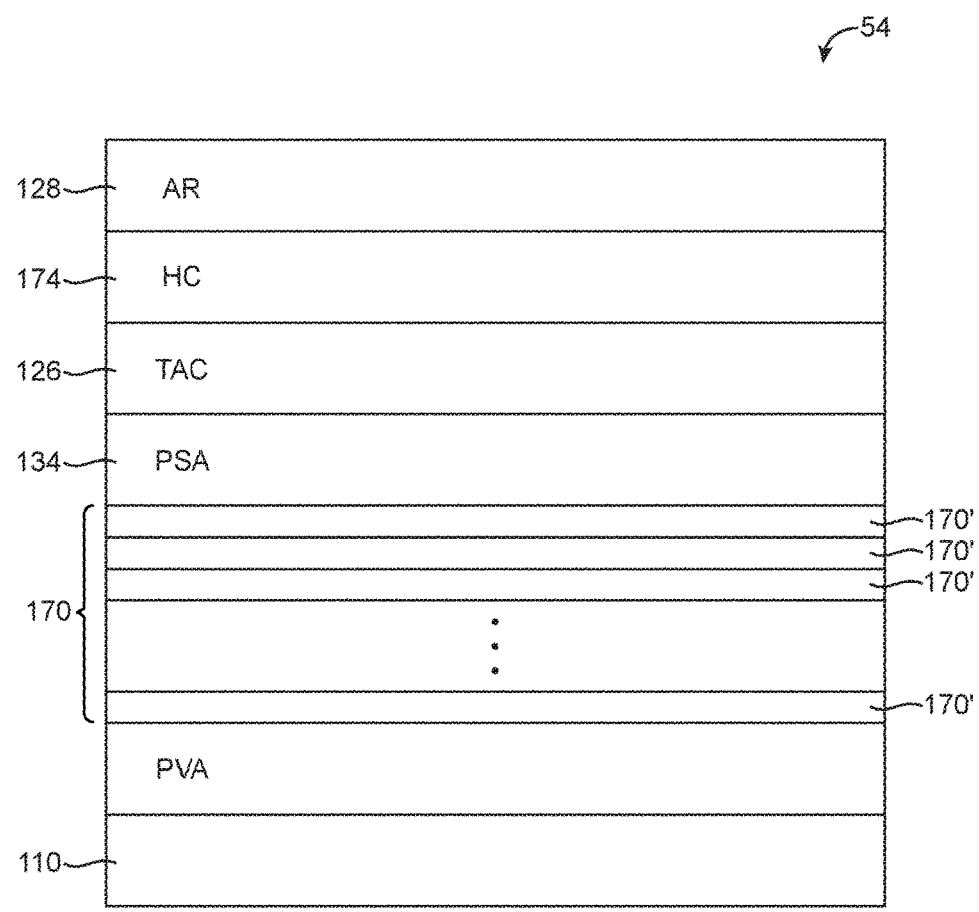
FIG. 26 is a cross-sectional side view of an illustrative polarizer in which a moisture barrier has been formed adjacent to a polarizer film in accordance with an embodiment.

FIG. 26 is an illustrative polarizer in which moisture barrier 170 has been attached to the upper surface of PVA layer 102. Pressure sensitive adhesive layer 134 attaches TAC layer 126 to moisture barrier layer 170. Moisture barrier layer 170 may include multiple inorganic layers 170' such as silicon oxide layers, aluminum oxide layers, coatings such as diamond like coating formed from silicon oxide or aluminum oxide (e.g., silicon oxide or aluminum oxide grown in the presence of carbon, nitrogen, or other materials, etc.) or other suitable moisture barrier inorganic structures and may include an optional clear polymer carrier layer such as a layer of polyethyleneterephthalate (PET) having a thickness of about 10-50 microns. Moisture barrier layer 170 may, if desired, be formed from a relatively thick layer of glass (e.g., a glass layer of 50 to 200 microns in thickness).

A layer such as acrylic hard coat layer 174 may be formed on TAC layer 126 to provide scratch resistance. Additional function layers such as antireflection layer 128 may be formed on top of layer 174. Layer 128 may have a 200 nm thickness or other suitable thickness. Layer 170 may have a thickness of 100 nm or other suitable thickness (e.g., less than 100 nm, more than 100 nm, 10-1000 nm, etc.).

Figure 27:
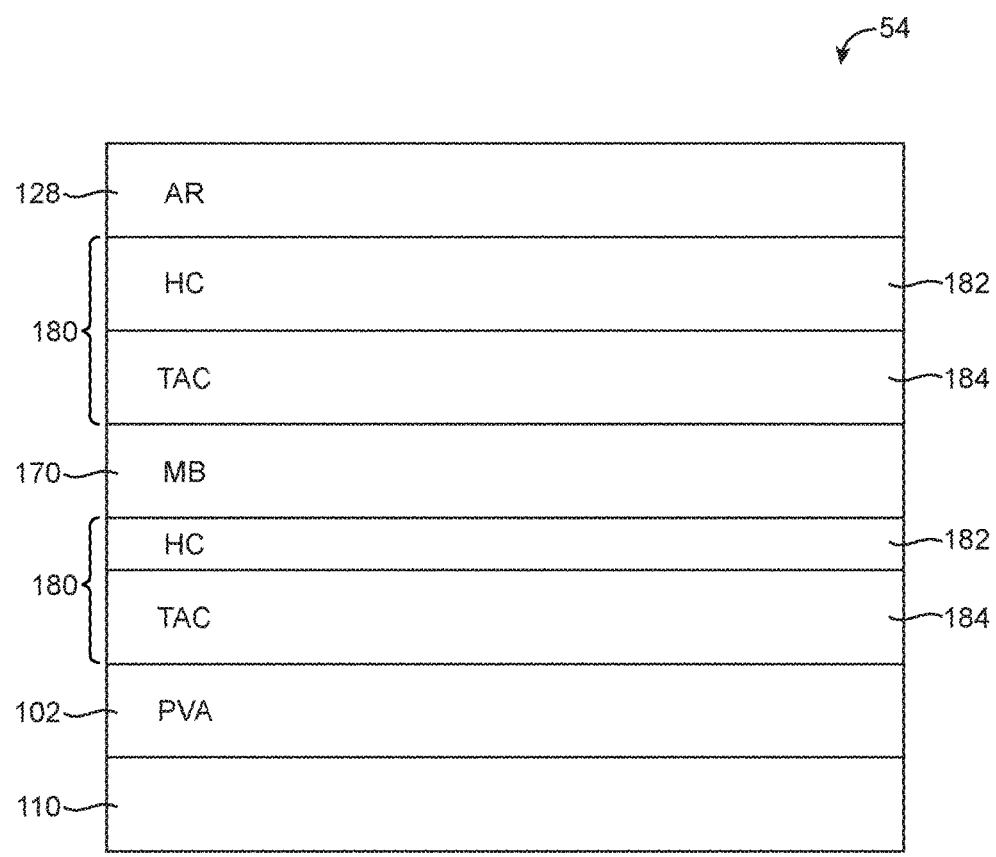
FIG. 27 is a cross-sectional side view of an illustrative polarizer in which a polymer layer has been interposed between a moisture barrier layer and a polarizer film in accordance with an embodiment.
Figure 28:
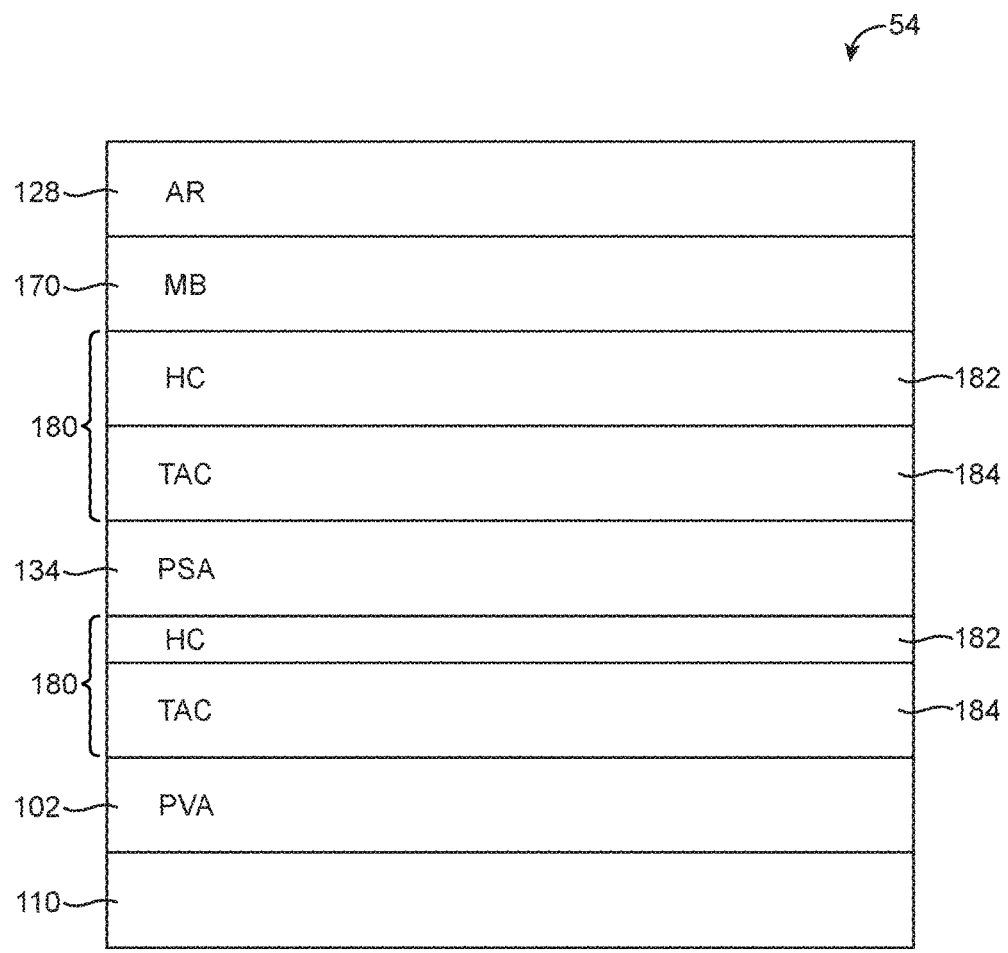
FIG. 28 is a cross-sectional side view of an illustrative polarizer in which a moisture barrier has been formed on top of a protective film in the polarizer in accordance with an embodiment.

FIG. 27 is a diagram of an illustrative configuration for polarizer 54 in which moisture barrier layer 170 has been formed between a pair of respective hard-coat covered TAC layers 180. Layers 180 may each include a TAC substrate layer 184 covered with a respective acrylic hard coat layer 186. In the illustrative configuration of FIG. 28, layers 180 are attached to each other using adhesive 134 and moisture barrier layer 170 is formed on top of the uppermost layer 180, between the uppermost layer 180 and a functional layer such as antireflection coating 128. If desired, one or both of hard coat layers 182 (e.g., the lower hard coat layer) may be omitted. Other configurations for incorporating moisture barrier layers into polarizer 54 may be used if desired. The illustrative configurations of FIGS. 25, 26, 27, and 28 are presented as examples.

The foregoing is merely illustrative and various modifications can be made by those skilled in the art without departing from the scope and spirit of the described embodiments. The foregoing embodiments may be implemented individually or in any combination.

What is claimed is:

1. A display polarizer layer, comprising:
 a polymer layer;
 a dichroic dye on the polymer layer that forms a polarized region and an unpolarized region;
 a moisture barrier layer; and
 an additional layer interposed between the moisture barrier layer and the polymer layer.

2. The display polarizer layer defined in claim 1 wherein the moisture barrier layer comprises a plurality of inorganic layers.

3. The display polarizer layer defined in claim 1 wherein the moisture barrier layer comprises a layer of glass having a thickness of 50 to 200 microns.

4. The display polarizer layer defined in claim 1 wherein the moisture barrier layer comprises a moisture barrier film having multiple inorganic layers.

5. The display polarizer layer defined in claim 1 wherein the moisture barrier layer is configured to exhibit a water vapor transmission rate of less than $10^{-2}$ g/m$^2$-day.

6. The display polarizer layer defined in claim 1 wherein the dichroic dye comprises iodine and wherein the polymer layer comprises stretched polyvinyl alcohol.

7. The display polarizer layer defined in claim 1 further comprising at least one tri-acetyl cellulose layer covered with an acrylic hard coat, wherein the tri-acetyl cellulose layer that is covered with the acrylic hard coat is interposed between the moisture barrier layer and the polymer layer.

8. A method of forming a display polarizer layer, comprising:
 coating a polymer layer with a dye;
 bleaching a portion of the dye to form an unpolarized region on the display polarizer layer; and
 chemically stabilizing the unpolarized region.

9. The method defined in claim 8 wherein the dye comprises iodine and wherein chemically stabilizing the unpolarized region comprises applying an iodine cleaning agent to the unpolarized region.

10. The method defined in claim 9 wherein applying the iodine cleaning agent comprises applying sodium thiosulfate to the unpolarized region.

11. The method defined in claim 8 wherein chemically stabilizing the unpolarized region helps prevent the unpolarized region from reverting to a polarized state.

12. The method defined in claim 8 wherein the polymer layer comprises a layer of polyvinyl alcohol.

13. The method defined in claim 8, further comprising:

attaching additional layers to the polymer layer, wherein the additional layers overlap the chemically stabilized unpolarized region.

14. A display comprising:

display layers; and a polarizer layer on the display layers, the polarizer layer comprising:

a layer of polarizing material having an unpolarized region; and a moisture barrier layer that overlaps the unpolarized region.

15. The display defined in claim 14 wherein the layer of polarizing material comprises a dichroic dye, the polarizer layer further comprising:

a polymer layer on which the layer of dichroic dye is formed.

16. The display defined in claim 14 wherein the layer of polarizing material is interposed between the polymer layer and the moisture barrier layer.

17. The display defined in claim 16, further comprising additional layers interposed between the moisture barrier layer and the layer of polarizing material.

18. The display defined in claim 17, further comprising an antireflection layer, wherein the moisture barrier layer is interposed between the antireflection layer and the additional layers.

19. The display defined in claim 17, wherein the additional layers comprise a tri-acetyl cellulose layer that is covered with a hard coat layer.

20. The display defined in claim 19, further comprising an additional tri-acetyl cellulose layer that is covered with an additional hard coat layer, wherein the moisture barrier layer is interposed between the tri-acetyl cellulose layer that is covered with the hard coat layer and the additional tri-acetyl cellulose layer that is covered with the additional hard coat layer.

* * * * *